Figure 2:
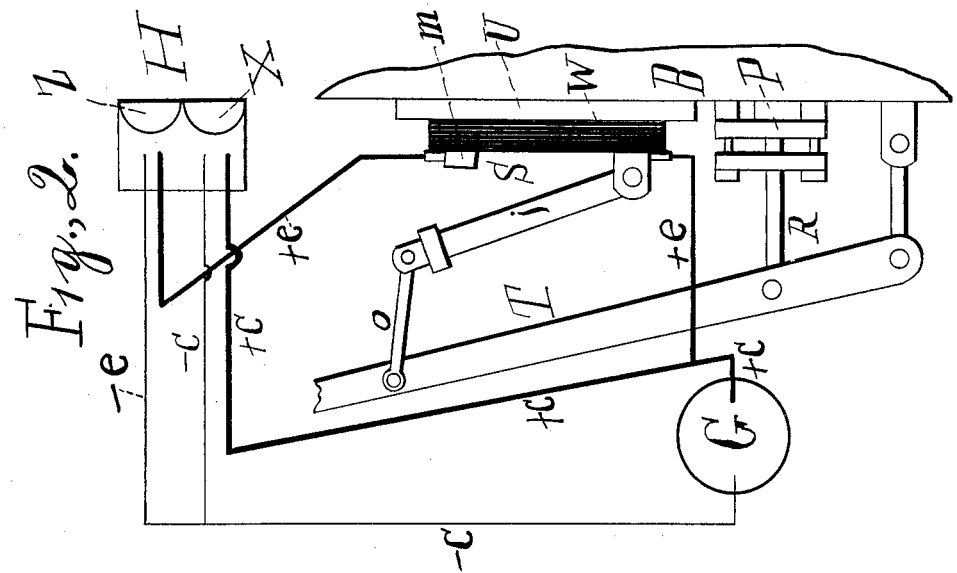

No. 816,139. PATENTED MAR. 27, 1906.
A. WALTER.
RAILWAY CAR AND LOCOMOTIVE HEADLIGHT.
APPLICATION FILED DEC. 18, 1901.

Witnesses:-
Urban A. Walter.
George C. Gernhardt

Inventor:
Adolph Walter.

UNITED STATES PATENT OFFICE.

ADOLPH WALTER, OF TOLEDO, OHIO.

RAILWAY CAR AND LOCOMOTIVE HEADLIGHT.

No. 816,139.        Specification of Letters Patent.        Patented March 27, 1906.

Application filed December 18, 1901. Serial No. 86,460

*To all whom it may concern:*

Be it known that I, ADOLPH WALTER, a citizen of the United States, residing at Toledo, in the county of Lucas and State of Ohio, have invented a new and useful Improvement in Railway Car and Locomotive Headlights for the Purpose of Preventing Collisions and other Accidents, of which invention the following is a specification.

The object of my invention is to cause the headlight of a car or locomotive to automatically indicate the state of rest or motion of such car or locomotive, and this I accomplish by locking or connecting a changeable or signaling head light or lights with the motion of the throttle or other power-controlling device of a vehicle, so that the motion of such throttle or other power-controlling device effects the signal shown by such car or locomotive, and by having the headlight of a car or locomotive thus automatically indicate the state of rest or motion of such car or locomotive all accidents at night arising from mistaking a headlight ahead for being that of a car in motion, whereas such car is at rest, or from mistaking a headlight ahead for being that of a locomotive or car at rest, whereas such locomotive or car is running, would be prevented.

The new and valuable feature of my invention is the connecting or locking of the throttle or other power-controlling device of a vehicle with a changeable or signaling headlight, and it is this combination of a changeable or signaling headlight, a means for actuating or changing the same, and the connecting or locking of such means for producing the headlight changes with the motion of the throttle or other power-controlling device that I claim as my invention and am desirous of securing by Letters Patent.

I submit herewith drawings showing a plan whereby my invention can be carried out on locomotives; but I do not mean that my invention is limited to the exact forms and plan shown.

In the drawings similar letters refer to similar parts in the two figures.

Figure 1:
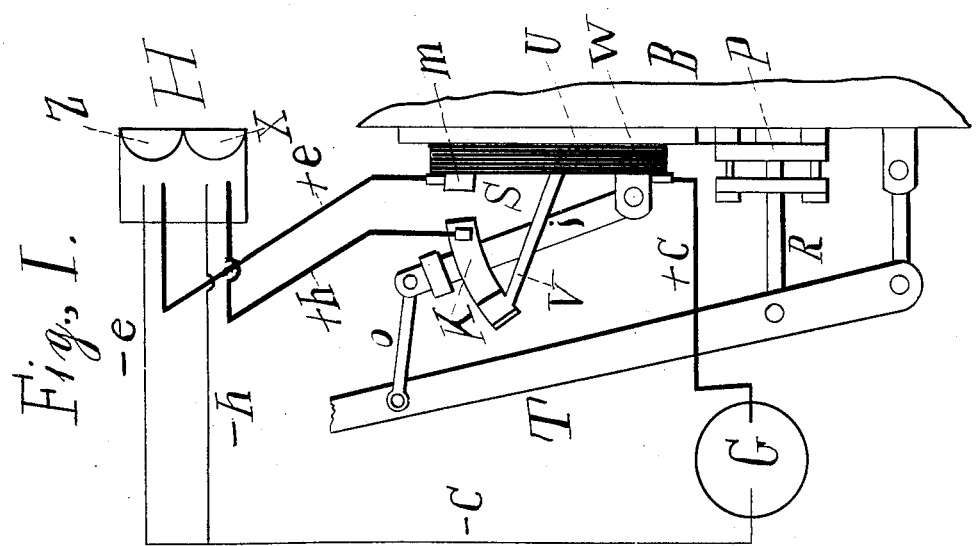

Figure 1 represents the top view of a throttle in its connection to the boiler, with an electrical switch attached, also showing a plan of wiring whereby the position of the throttle, and consequently the state of rest or motion of the locomotive, would always be shown by the head light or lights. Fig. 2 shows a slightly-different method of wiring from that shown in Fig. 1.

In Fig. 1, B is the end of the boiler; G, the generator or source of electricity; H, the headlight, (H is not taken to be in its proper position and is merely shown to indicate the connection;) P, the packing-holder for the throttle-stem R. S is the electrical switch. U is a metallic base secured to the boiler-head, and W is a non-conducting switchboard upon which the switch S is mounted and to which the support V, which holds the conducting-sector K in position, is secured. When the throttle T is open, as indicated, it holds the conducting-knife $i$ of the knife-switch S toward the left by means of the connecting-bar O. This knife is then in contact with the grooved or inner surfaces of the conducting-sector K. As long as the throttle remains entirely or partially open the knife $i$ will be in contact with the conducting-sector K at some point of the arc, and a circuit supplying the running light or signal X will be maintained, the circuit consisting of the wire $+c$, leading from the source G, the knife $i$, the sector K, and the wire $+h$ on the one side and on the other the wire $-h$ and the wire $-c$, leading back to the source G. Thus as the knife of the switch moves along the sector K in consequence of the variations in the position of the throttle the circuit which conducts the electricity to the lower light X would remain unbroken and the running-headlight or "in-motion" signal be displayed. If then the throttle would be completely closed, the rod O would force the conducting-knife $i$ to the right until it came in contact with $m$. The current from the supply-wires would then pass through the circuit made with the wires $+e$ and $-e$, causing the upper headlight or signal Z to be lighted. The "at-rest" signal would then be displayed.

If thought desirable, the sector K could be dispensed with, as shown in Fig. 2. The supply-wires $+c$ and $-c$ would then run directly to the lower or in-motion signal, so that whenever the supply of electricity would be on the in-motion light would remain burning. Then whenever the knife $i$ would be brought in contact with $m$ a branch circuit along $+e$ and $-e$ would be closed with the upper light or signal Z. The state of rest in the locomotive would then be indicated by the burning of the signal-light Z above the regular headlight X, which would also be lighted. This upper or signal light could be made with any color of lens or combination of lights or placed in any position suitable for the displaying of a signal, since my invention does not consist in any special design of headlight or set of signals, but simply in the locking of a changeable headlight with the throttle motion.

Of course it is understood that with the electric headlight any variety of single or double pole switch could be used.

I am aware that patents have been secured on headlights arranged with signaling devices of various kinds. Therefore I do not broadly claim such as my invention; but I am not aware that a changeable headlight or signal thereof has ever been automatically operated or actuated by the throttle motion.

I have already mentioned that my invention would be of value on cars having a means of self-propulsion, as well as on locomotives, and therefore wherever the word "throttle" appears in the specification and claims I refer thereby to the controller-lever of an electric car as well as to the throttle of a locomotive.

Hence, as my invention, I claim—

1. The combination, in an automatically-signaling headlight for locomotives and cars, of a suitable electric headlight; a circuit connecting said headlight with a source of electricity; and a switch in said circuit locked to, and operated by, the throttle-lever.

2. The combination, in an automatically-signaling electric headlight, of a plurality of electric lights, constituting an "in-motion" and an "at-rest" signal; a circuit over which when closed electricity flows to said "in-motion" signal, from a suitable source; a circuit over which when closed electricity flows to said "at-rest" signal from said source; a double-throw switch located in the leads from said source, whereby either said "in-motion" or said "at-rest" signal is closed with said source; and a means connecting said double-throw switch with the motion of the throttle.

3. The combination, in an automatically-signaling electric headlight, of two electric lights, one constituting an "in-motion" and the other an "at-rest" signal; circuits connecting said electric lights with a source of electricity; a double-throw switch locked to, and operated by, the power-controlling device, arranged in said circuits and closing either the one or the other with said source, according to the position of said power-controlling device; a long conducting-surface placed in the circuit leading to the "in-motion" signal and so arranged that said switch will be in movable contact therewith as long as said power-controlling device remains open; and a contact-piece placed in the circuit leading to the "at-rest" signal and adapted to have contact with said switch only when said power-controlling device is closed.

4. The combination, in an automatically-signaling electric light for locomotives and cars, of a suitable electric light-signal; a circuit connecting said light-signal with a suitable source of electricity; and a switch in said circuit locked to, and operated by, the throttle-lever.

ADOLPH WALTER.

Witnesses:
URBAN A. WALTER,
CHARLIE CHERRY.